3,184,385
DRY, VITAMIN-ACTIVE PRODUCT AND PROCESS FOR PREPARING SAME
Lawrence A. Anderson, Rochester, N.Y., assignor to Eastman Kodak Company, Rochester, N.Y., a corporation of New Jersey
No Drawing. Filed Oct. 16, 1961, Ser. No. 145,445
15 Claims. (Cl. 167—81)

This invention relates to vitamins. More particularly it relates to dry, fat-soluble vitamin-active products in free flowing, finely divided form.

As is well known, fat-soluble vitamins are those vitamin-active compounds which generally are soluble in fats and oils and substantially insoluble in water. Representative of these materials are the naturally occurring vitamins A, D and E and the commercially available, synthesized derivatives, such as, for example, vitamin A acetate, vitamin A palmitate and α-tocopheryl acetate. Many of the fat-soluble vitamin-active compounds and concentrates are oils at normal room temperatures.

It is well known that certain ones of the fat-soluble vitamin-active compounds, particularly those having vitamin A activity, lose potency on being exposed over a period of time to air. Consequently, it has become customary to surround minute portions (droplets or finely divided solids, as the case may be) of these fat-soluble vitamin-active compounds with an air impermeable, inert, protective material or carrier. Examples of such a material are the water soluble, digestible, colloids such as gelatin, gum acacia, pectin, gum tragacanth and the like, and certain water immiscible, digestible, low melting waxes. The resulting products are usually obtained in dry, finely divided, generally free flowing forms ranging from powder to beadlets, depending on the procedure employed to make them.

Besides affording protection from air these generally free flowing, finely divided, dry, fat-soluble vitamin products have another advantage in that they facilitate uniform or homogeneous distribution of vitamin-active compositions in animal feed supplements and in animal feeds. However, when pelleted animal feeds and the like are involved, problems arise.

In the production of pelleted animal feeds and the like steam and elevated temperatures are usually employed. Under such conditions and with the protective materials or carriers heretofore employed, the dry, finely divided, fat-soluble vitamin products tend to disintegrate or melt and to release the fat-soluble vitamin-active compositions which they contain. This in turn leads to a loss in potency by destruction of the fat-soluble vitamin activity.

Hence, there is a need for new, dry, fat-soluble vitamin products in free flowing, finely divided form, which are stable under animal feed pelleting conditions. A general object of this invention is to meet this need.

Specifically, an object of this invention is to provide a dry, fat-soluble vitamin-active product in free flowing, finely divided form, which is especially suited for incorporation into pelleted animal feeds and the like.

A special object of this invention is to provide a dry, fat-soluble vitamin-active product in free flowing, digestible, particle form, which possesses good stability and high vitamin potency, which is substantially insoluble in water at temperatures up to about 300° F. and which is physically resistant to water saturated vapor or hot gases at such temperatures.

These and other objects are achieved by this invention.

In summary, this invention involves broadly a new composition of matter. It is a dry, finely divided, free flowing product, the particles of which contain a water-insoluble, fat-soluble vitamin-active composition dispersed in minute portions (as droplets or finely divided solid particles, as the case may be) within a carrier which is a solid matrix consisting essentially of a starch ester characterized by resistance to water wetting and by the ability to gel in aqueous colloidal solution upon lowering of the solution temperature at which the colloidal solution is formed. In addition, this invention also comprises processes for preparing this product.

The water-insoluble fat-soluble vitamin-active composition of this invention comprises one or more substantially water-insoluble synthetic or natural vitamins A, D, E, K, carotene and the like, vitamin-active derivatives thereof and mixtures of such compounds. Examples of vitamin A active compounds are vitamin A alcohol, vitamin A ester, such as the acetate and palmitate esters, and vitamin A aldehyde. An example of a vitamin E active compound is α-tocopheryl acetate. Included in the vitamin-active composition can be suitable antioxidants (both oil-soluble and water-soluble), such as tocopherols, butylated hydroxyanisol, butylated hydroxytoluene and the like, surfactants and the like.

Concentration of the water-insoluble, fat-soluble vitamin-active composition in the fat-soluble vitamin-active product of this invention is greater than zero but generally less than about forty-five percent by weight of the product. It is usually in a range from about 15% to about 35% by weight of the product.

The carrier for the water-insoluble, fat-soluble vitamin-active composition, according to the concepts of this invention, consists essentially of a starch ester which is a carboxylic acid modified starch normally in solid form. On being finely divided, it is free flowing. It is characterized by resistance to water-wetting to a higher degree than in the case of unmodified starch. Another important characteristic is its ability to form a gel in an aqueous colloidal solution of it when the solution temperature is decreased below that at which the aqueous colloidal solution is formed. A suitable starch ester is that prepared, for example, as disclosed in Example IX of the U.S. Patent No. 2,613,206, to Caldwell, by reacting a starch of any origin, but preferably corn starch, with octenyl succinic anhydride at a concentration up to a maximum of about 2% by weight of the starch and neutralizing with aluminum sulfate. Such a starch ester, referred to hereinafter as high viscosity, starch aluminosuccinate ester, is commercially available as "Dry-Flo" starch from the National Starch and Chemical Corp., New York, New York.

The carrier can also comprise a suitable edible plasticizer such as, for example, glucose or sucrose, other compatible colloids such as, for example, gelatin, natural gums and the like.

Concentration of the carrier portion of the fat-soluble vitamin-active product of this invention is less than 100% but generally greater than about fifty-five percent by weight of the product and usually in a range from about 65% to about 85% by weight of the product. Concentration of the starch ester of this invention in the carrier (not in the product) is generally in a range from about 50% to about 100% by weight of the carrier. Concentration of the edible plasticizer can range up to about 50% by weight of the carrier material. If the plasticizer is gelatin, the maximum concentration of this material is about 50% by weight. If the plasticizer is glucose or sucrose, the maximum concentration is about 25% by weight of the carrier portion.

The dry, fat-soluble vitamin-active product of this invention is preferably prepared in accordance with this procedure: (1) prewet starch ester powder with a water-wetting agent therefor to form a prewetted powder, (2) dissolve said prewetted powder colloidally in water to form a colloidal solution, (3) disperse the water-inso1u- ble, fat-soluble vitamin-active composition in the colloidal solution and (4) convert the resulting dispersion into finely divided, dry, solid particles.

The first step of this preferred procedure arises because of the starch ester having the property of being so resistant to water wetting that when added to water it remains dry and floats on the water surface. It is necessary in this process to temporarily mask this property. It is done by admixing the starch ester with a water-wetting agent therefor, which is soluble in water and which at least prewets the starch ester particles. The water wetting agent must be inert under the conditions of this invention to the starch ester and vitamin-active composition. A suitable water-wetting agent is a lower boiling alcohol such as, for example, methanol, ethanol and the like. A surfactant type wetting agent can also be employed. If it is desired to keep the water-wetting agent out of the end product, the agent must have a boiling point lower than that of water, preferably at the temperature at which the prewetted starch ester suspended in water hydrates and goes into colloidal solution. In using the aforementioned high viscosity, starch alumino-succinate ester powder and methanol as a water-wetting agent therefor, there should be present at least 0.75 milliliter of the alcohol per gram of powder.

The second step of this preferred procedure, namely: dissolving said prewetted powder colloidally in water to form a colloidal solution, preferably is carried out by suspending the prewetted powder in water and while vigorously agitating the suspension heating the suspension until the powder goes into colloidal solution.

The prewetted powder is suspended in water by adding the prewetted powder to a container of water by means of, for example, a high local shear, high speed, impeller type mixer and vigorously agitating the container contents. The powder concentration is selected to give to the ultimate colloidal solution at the commencement of the third step an absolute viscosity at the prevailing temperature of the solution in a range from about 100 centipoises to about 5000 centipoises. Accordingly the powder concentration in the water can be up to about 20% by weight. A preferred powder concentration in the case of high viscosity, starch alumino-succinate ester is about 17% by weight of the suspension.

In heating the suspension care should be taken that after the powder goes into colloidal solution, temperature of the colloidal solution is maintained below that at which the solution "sets up" or gels. Otherwise, dispersion in the colloidal solution of the vitamin-active composition becomes impractical at practical powder inputs. In the case of high viscosity, starch alumino-succinate ester powder it has been found that at a powder concentration in water of 16.6% by weight 65° C. is about the temperature at which colloidal dissolution takes place and that 70°–75° C. is about the temperature at which the colloidal solution gelatinizes. Hence, in the case of this particular starch ester at a concentration of about 17% by weight it is preferred to heat the suspension to about 65° and to maintain the resulting colloidal solution at about this temperature until after the third step has been performed. Incidentally, at this temperature and when using methanol as the prewetting agent most of the methanol evaporates in this step. After or during the formation of the colloidal solution other components, if any, of the carrier composition, such as a plasticizer, another compatible colloid and the like are added and thoroughly mixed in with the starch ester and water.

The third step of dispersing the water-insoluble, fat-soluble vitamin-active composition in the colloidal solution is accomplished by adding to the colloidal solution with vigorous stirring the fat-soluble vitamin-active composition. The water-insoluble, fat-soluble vitamin-active composition should be well dispersed in the colloidal solution, the particle size of the droplets or solids thereof being many times smaller than the desired ultimate minimum particle size of the end product. Generally the particle size should be less than about 15 microns.

The fourth step of this preferred process, that of converting the dispersion resulting from the third step into finely divided, dry, solid particles can be accomplished in a number of ways. In this regard it should be noted that the dispersion can now be heated to a higher temperature to decrease its viscosity. In the case of the high viscosity, starch alumino-succinate ester it has been found that the dispersion prepared therefrom by this process can at this point be heated to as much as 80° C. without gelatinization occurring. Such decreased viscosity is sometimes desirable in carrying out this fourth step.

One way in which this fourth step can be performed is by dispersing the hot dispersion in mineral oil at a temperature below 90° C., preferably at or below 55° C., and then cooling the mineral oil while agitating the same until the droplets of the dispersion have gelled. These droplets of dispersion gel slowly and, therefore, in order to minimize coalescence should be maintained under agitation for the period of time it takes for gelation to take place. The gelled droplets or beadlets are then filtered from the mineral oil, washed with an inert solvent for the mineral oil, such as, for example, cool hexane, and air dried. Preferably the solvent should be one which does not substantially leach vitamin-active material from the beadlets. In the way here followed, isopropanol alone was found to result in an appreciable leaching of vitamin-active material, such as vitamin A aldehyde, from beadlets formed from high viscosity starch alumino-succinate ester powder. Finely divided silica powder or other anti-sticking agents can be added to the beadlets to prevent sticking of the beadlets during drying.

Another way of converting the dispersion into finely divided, dry, solid particles is to disperse the hot dispersion in water established and maintained at a temperature at and preferably below 50° C. Gelled beadlets are formed under such conditions. These beadlets are filtered from the water, washed with a 25% by weight solution of isopropanol alcohol in hexane preferably containing in suspension finely divided silica, and then air dried.

Still another way is to spread the hot dispersion into a thin layer on a cooled surface. A thin, gelled sheet is formed. The gelled sheet is dried in a heated air stream and then comminuted and sieved to the desired particle size.

Still another way is to extrude the hot dispersion through a cooled die to form filaments of gelled dispersion. The filaments are air dried, comminuted and sieved to the desired particle size.

Of course, with suitable pre-adjustment of water content the dispersion can be spray dried in accordance with the procedures of the prior art.

This invention is further illustrated by the following examples of various aspects including specific embodiments thereof. This invention is not limited to these specific embodiments unless otherwise indicated.

*Example 1*

This example illustrates a dry, finely divided, free flowing, vitamin A active product of this invention, useful for pelleted animal feeds and the like, and a process of this invention for preparing it.

Admix 16.6 parts by weight of finely divided, high viscosity, starch alumino-succinate ester (Dry-Flo starch ester) with 0.75 milliliter of methanol per gram of starch ester. Disperse the prewetted starch ester powder in 83.4 parts by weight of water by introducing the powder into the water with rigorous agitation. While continuing agitation, heat the resulting suspension to 65° C. and maintain it at this temperature until the powder goes into colloidal solution. Disperse in the colloidal solution to a droplet size of about 2 microns 4.2 parts by weight of distilled vitamin A aldehyde by introducing this vitamin A active oil into the colloidal solution with vigorous agitation. This results in a dispersion in the form of an emulsion containing 20% by weight of vitamin A aldehyde on a dry weight basis. Heat this emulsion to 80° C.

Disperse the hot emulsion in mineral oil having a temperature established and maintained at 0° C. After the droplets of emulsion gel and gelation is complete, filter the resultant beadlets from the mineral oil, wash with hexane at 0° C. and then air dry the washed beadlets. If desired, the beadlets can also be dehydrated with isopropanol. However, this is not preferred since this has resulted in the laboratory in an appreciable leaching of the vitamin A aldehyde from the beadlets.

*Example 2*

This example illustrates another process of this invention for preparing the solid, vitamin A active product of Example 1.

Repeat that portion of the process of Example 1 up to, but not including, the step of dispersing the hot emulsion in mineral oil. Instead, disperse the emulsion in water having a temperature established and maintained at 25° C. Gelled beadlets will form which are insoluble in water. Filter the beadlets from the water and air dry the beadlets.

*Example 3*

This example illustrates still another process of this invention for preparing the solid, vitamin A active product of Example 1.

Repeat the steps of the process of Example 1 up to, but not including, the step of dispersing the emulsion in mineral oil. Instead, pour the emulsion onto a cool horizontal surface until a thin layer forms. Upon gelation of the layer, slice the resulting sheet into strips and dry the strips in ambient air. Comminute the dried strips in a hammermill to particles for the most part in the −30 to +100 U.S. screen size mesh range. Screen out the particles in this range and wash with hexane to remove exposed vitamin A aldehyde. 10 milliliters of hexane per gram of solids is usually sufficient for this purpose.

In performing in the laboratory this embodiment of the process, test procedures showed that only 4.0 weight percent of the vitamin A aldehyde content was exposed at the beadlet surfaces by the grinding step. Moreover, the hexane washed beadlet particles showed no tendency to dissolve in water at 212° F.

*Example 4*

This example illustrates a dry, finely divided, free flowing, vitamin E active product of this invention, useful for pelleted animal feeds and the like, and a process of this invention for preparing it.

Admix 14.9 parts by weight of high viscosity, starch alumino-succinate ester powder (Dry-Flo starch ester) with 0.75 milliliter of methanol per gram of the starch ester. Suspend the thus prewetted starch ester in 74.3 parts by weight of water by admixing the same with intense agitation. While continuing the intense agitation heat the resulting suspension to 65° C. and maintain this temperature until the suspended starch ester goes into colloidal solution. Then, disperse in the colloidal solution to about a 2 micron droplet size with the aid of said intense agitation 10.8 parts by weight of d-alpha-tocopheryl acetate oil. A vitamin E active dispersion in the form of an emulsion is thereby formed.

Spread out the emulsion into a thin layer on a cool, horizontal surface and let the layer gel. Upon gelation remove the sheet from the cool surface and dry in a warm air stream. Comminute in a hammermill and screen Wash the screened particles with hexane.

*Example 5*

This example illustrates another process of this invention for preparing the solid, vitamin E active product of Example 4.

Repeat the steps of the process of Example 4 through the step of forming the vitamin E active emulsion. Then, extrude the emulsion through a cooled, filament forming die. Air dry the resulting filaments. Comminute the filaments in a hammermill and screen. Wash the screened particles with hexane.

In practicing this process in the laboratory a d-alpha-tocopheryl acetate oil was used which at the 10.8 parts by weight concentration would provide a vitamin E potency of 575 IU of vitamin per gram of dry solids, assuming no loss of potency or oil occurred in carrying out the process. It was found that hexane washing of the −30 mesh U.S. screen size product resulted in an extraction of only 17.5% by weight of the input d-alpha-tocopheryl acetate oil. Furthermore, the final product was a free flowing, hot water insoluble, granular powder having a vitamin E potency of 475 IU per gram.

Thus, a dry, free flowing, fat-soluble vitamin-active powder is provided which is particularly useful, although not so limited, in pelleted animal feeds and the like.

Other embodiments, advantages and features of this invention will be readily apparent to those in the exercise of ordinary skill in the art upon reading the foregoing disclosure. All embodiments of this invention as well as variations and modifications thereof which embrace the spirit and essential characteristics of this invention are included within the scope of the claimed subject matter unless expressly excluded by claim language.

I claim:

1. A vitamin product in a dry, finely divided, free flowing solid state, the particles of which comprise a fat-soluble vitamin-active composition dispersed within a solid matrix consisting essentially of high viscosity, starch alumino-succinate ester.

2. A vitamin product in a dry, finely divided, free flowing solid state, the particles of which comprise a fat-soluble vitamin-active composition at a concentration greater than zero but less than about forty percent by weight of said product and dispersed within a solid matrix consisting essentially of high viscosity, starch alumino-succinate ester.

3. A vitamin product in a dry, finely divided, free flowing solid state, the particles of which comprise a fat-soluble vitamin-active composition at a concentration in a range from about 15% to about 35% by weight of the product and dispersed within a solid matrix consisting essentially of high viscosity, starch alumino-succinate ester.

4. A vitamin product in a dry, finely divided, free flowing solid state, the particles of which comprise a fat-soluble vitamin-active composition at a concentration in a range from about 15% to about 35% by weight of the product and dispersed within a solid matrix consisting essentially of high viscosity, starch alumino-succinate ester, said fat-soluble vitamin-active composition comprising a fat-soluble vitamin-active oil.

5. A vitamin product according to claim 4 wherein said fat-soluble vitamin-active oil consists essentially of vitamin A aldehyde.

6. A vitamin product according to claim 4 wherein said fat-soluble vitamin-active oil consists essentially of an alpha-tocopheryl acetate.

7. A process for making a dry, finely divided, free flowing, vitamin-active, solid product, which comprises: (1) preparing a colloidal solution of water and high viscosity, starch alumino-succinate ester; (2) dispersing a water-insoluble, vitamin-active composition in said colloidal solution, whereby a dispersion is formed; and (3) converting said dispersion into dry, finely divided, free flowing, solid particles.

8. A process for making a dry, finely divided, free flowing, vitamin-active, solid product which comprises: (1) preparing a colloidal solution of water and high viscosity, starch alumino-succinate ester by (a) prewetting a powder of said ester with a prewetting agent therefor to form a prewetted powder, (b) suspending the prewetted powder in water to form a suspension with a powder concentration of about 17% by weight and (c) while agitating the suspension heating the same to a temperautre of at least about 65° C. and maintaining the suspension at about this temperature until the powder goes into colloidal solution; (2) dispersing a fat-soluble vitamin-active composition in said colloidal solution to a particle size less than the ultimate particle size of said product, whereby a dispersion is formed; and (3) converting said dispersion into dry, finely divided, free flowing, solid particles.

9. A process according to claim 8 wherein said prewetting agent is methanol.

10. A process for making a dry, finely divided, free flowing, vitamin-active, solid product, which comprises: (1) preparing a colloidal solution of water and high viscosity, starch alumino-succinate ester by (a) prewetting a powder of said ester with a prewetting agent therefor to form a prewetted powder, (b) suspending the prewetted powder in water to form a suspension with a powder concentration of about 17% by weight and (c) while agitating the suspension heating the same to a temperature of at least about 65° C. and maintaining the suspension at about this temperature until the powder goes into colloidal solution; (2) dispersing a fat-soluble vitamin-active composition in said colloidal solution to a particle size less than the ultimate particle size of said product, whereby a dispersion is formed; and (3) converting said dispersion into dry, finely divided, free flowing, solid particles by dispersing the dispersion in mineral oil at a temperature below 90° C., cooling and agitating the mineral oil until the dispersion gels and forms solid particles, separating the solid particles from the mineral oil, and air drying the solid particles.

11. A process according to claim 10 wherein the dispersion is dispersed in mineral oil at a temperature below 55° C.

12. A process for making a dry, finely divided, free flowing, vitamin-active, solid product, which comprises: (1) preparing a colloidal solution of water and high viscosity, starch alumino-succinate ester by (a) prewetting a powder of said ester with a prewetting agent therefor to form a prewetted powder (b) suspending the prewetted powder in water to form a suspension with a powder concentration of about 17% by weight and (c) while agitating the suspension heating the same to a temperature of at least about 65° C. and maintaining the suspension at about this temperature until the powder goes into colloidal solution; (2) dispersing a fat-soluble vitamin-active composition in said colloidal solution to a particle size less that the ultimate particle size of said product, whereby a dispersion is formed; and (3) converting said dispersion into dry, finely divided, free flowing, solid particles by dispersing the dispersion in water established and maintained at a temperature below about 50° C., whereby the dispersion gels and forms solid particles, removing the solid particles from the water and drying the same.

13. A process for making a dry, finely divided, free flowing, vitamin-active, solid product, which comprises: (1) preparing a colloidal solution of water and high viscosity, starch alumino-succinate ester by (a) prewetting a powder of said ester with a prewetting agent therefor to form a prewetted powder, (b) suspending the prewetted powder in water to form a suspension with a powder concentration of about 17% by weight and (c) while agitating the suspension heating the same to a temperature of at least about 65° C. and maintaining the suspension at about this temperature until the powder goes into colloidal solution; (2) dispersing a fat-soluble vitamin-active composition in said colloidal solution to a particle size less than the ultimate particle size of said product, whereby a dispersion is formed; and (3) converting said dispersion into dry, finely divided, free flowing solid particles by spreading the dispersion into a thin layer on a cooled surface whereby a thin gelled sheet is formed, drying the gelled sheet, comminuting the sheet to finely divided particles and removing exposed fat-soluble vitamin-active composition from said particles.

14. A process for making a dry, finely divided, free flowing, vitamin-active, solid product, which comprises: (1) preparing a colloidal solution of water and high viscosity, starch alumino-succinate ester by (a) prewetting a powder of said ester with a prewetting agent therefor to form a prewetted powder, (b) suspending the prewetted powder in water to form a suspension with a powder concentration of about 17% by weight and (c) while agitating the suspension heating the same to a temperature of at least about 65° C. and maintaining the suspension at about this temperature until the powder goes into colloidal solution; (2) dispersing a fat-soluble vitamin-active composition in said colloidal solution to a particle size less than the ultimate particle size of said product, whereby a dispersion is formed; and (3) converting said dispersion into dry, finely divided, free flowing, solid particles by extruding said dispersion through a cooled die to form filaments, air drying the filaments, comminuting the filaments to finely divided particles and removing exposed fat-soluble vitamin-active composition from said particles.

15. A process for making a dry, finely divided, free flowing, vitamin-active, solid product, which comprises: (1) preparing a colloidal solution of water and high viscosity, starch alumino-succinate ester by (a) prewetting a powder of said ester with a prewetting agent therefor to form a prewetted powder, (b) suspending the prewetted powder in water to form a suspension with a powder concentration of about 17% by weight and (c) while agitating the suspension heating the same to a temperature of at least about 65° C. and maintaining the suspension at about this temperature until the powder goes into colloidal solution; (2) dispersing a fat-soluble vitamin-active composition in said colloidal solution to a particle size less than the ultimate particle size of said product, whereby a dispersion is formed; and (3) converting said dispersion into dry, finely divided, free flowing, solid particles by spray drying.

References Cited in the file of this patent

UNITED STATES PATENTS

| | | |
|---|---|---|
| 2,613,206 | Caldwell | Oct. 7, 1952 |
| 2,756,177 | Cannalonga | July 24, 1956 |
| 2,876,160 | Schoch | Mar. 3, 1959 |